Nov. 24, 1953   P. G. GILBERT   2,660,213
WHEEL RIM SUSPENSION
Filed June 1, 1949   2 Sheets-Sheet 1
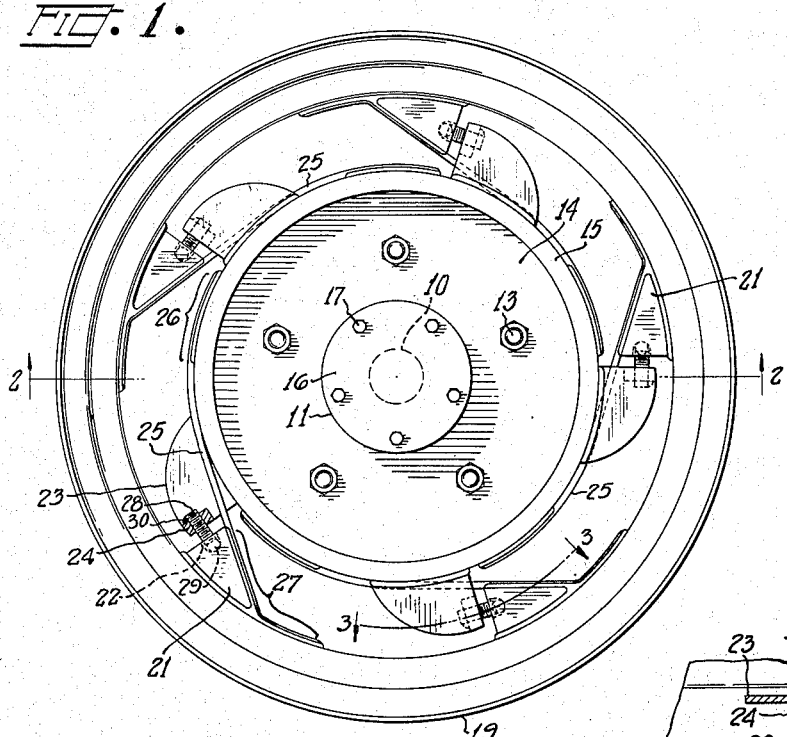
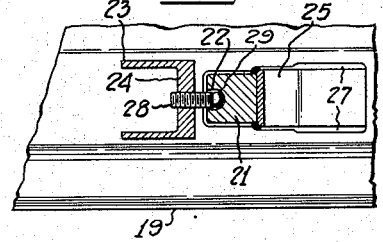
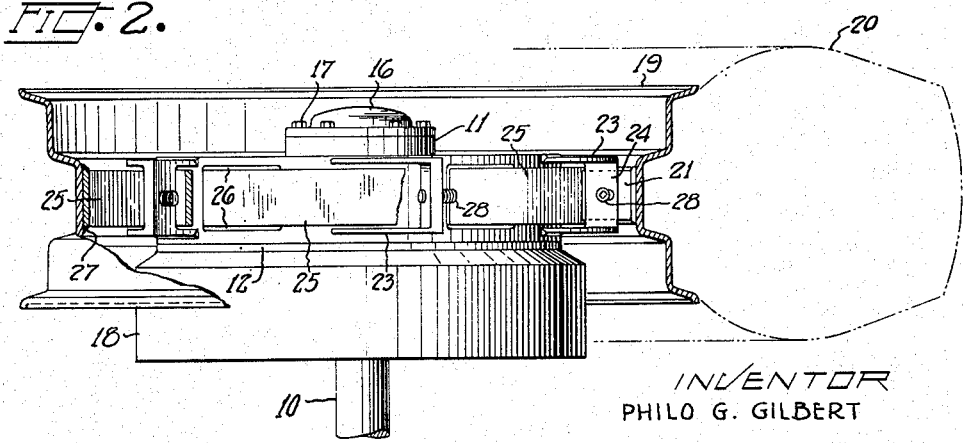
INVENTOR
PHILO G. GILBERT
ATTORNEY Nov. 24, 1953 P. G. GILBERT 2,660,213
WHEEL RIM SUSPENSION
Filed June 1, 1949 2 Sheets-Sheet 2

INVENTOR
PHILO G. GILBERT

BY
ATTORNEY

Patented Nov. 24, 1953

2,660,213

UNITED STATES PATENT OFFICE 2,660,213

WHEEL RIM SUSPENSION

Philo G. Gilbert, Seattle, Wash., assignor to Gilbert Wheel Inc., Portland, Oreg., a corporation of Delaware Application June 1, 1949, Serial No. 96,454

4 Claims. (Cl. 152—75)

1

This invention relates generally to wheels and particularly to wheels, the principal use of which is at relatively high rotational speeds.

Reference is here made to my previous U. S. Patent No. 2,431,802, issued December 2, 1947, on a "Wheel," and to my pending U. S. patent application, S. N. 48,068, filed September 7, 1948, now Patent No. 2,522,710 issued September 19, 1950, on a "Wheel."

The main object of this invention is to provide an improved rim suspension system for a wheel used at relatively high rotating speeds whereby, although the wheel hub and wheel rim are apparently firmly and rigidly fixed in relative position, the means connecting the rim to the hub will be sufficiently resilient in a plane perpendicular to the axle on which the wheel is mounted to allow the necessary slight movement of the rim relatively to the hub for each to rotate around its required axis.

The hub necessarily must rotate about the rotating center of the bearings on which the hub is mounted, but since its radius of gyration is relatively short, a slight unbalance of the hub member of the wheel will not usually vibrate the axle. However, the radius of gyration of the wheel rim is relatively long and an unbalance at the rim will cause a noticeable and disagreeable vibration of the axle if the rim and hub are rigidly connected.

This invention provides a means for connecting the rim of a wheel to its hub in a way that is both simple and easy, as well as inexpensive to construct and which is sensibly rigid but which at higher rotating speeds has sufficient resiliency in a plane perpendicular to the axle to allow the rim to rotate approximately about its natural center of gyration.

When applied to the wheels of an automobile, this device results in a noticeably steadier ride than does the usual automobile wheel. When applied to a fly-wheel, this device results in a noticeably quieter running machine.

How the suspension of this invention may be constructed and applied in two specific forms will be understood from the following description referring to the accompanying drawings, in which:

Fig. 1 is an outside elevation of an automobile wheel equipped with one form of the suspension of this invention.

Fig. 2 is a broken view of the wheel in partial section along the line 2—2 of Fig. 1.

Fig. 3 is a fragmentary section along the line 3—3 of Fig. 1.

Fig. 4 is a side elevation in partial section of

2 a fly-wheel equipped with a second form of the suspension of this invention.

Figure 4:
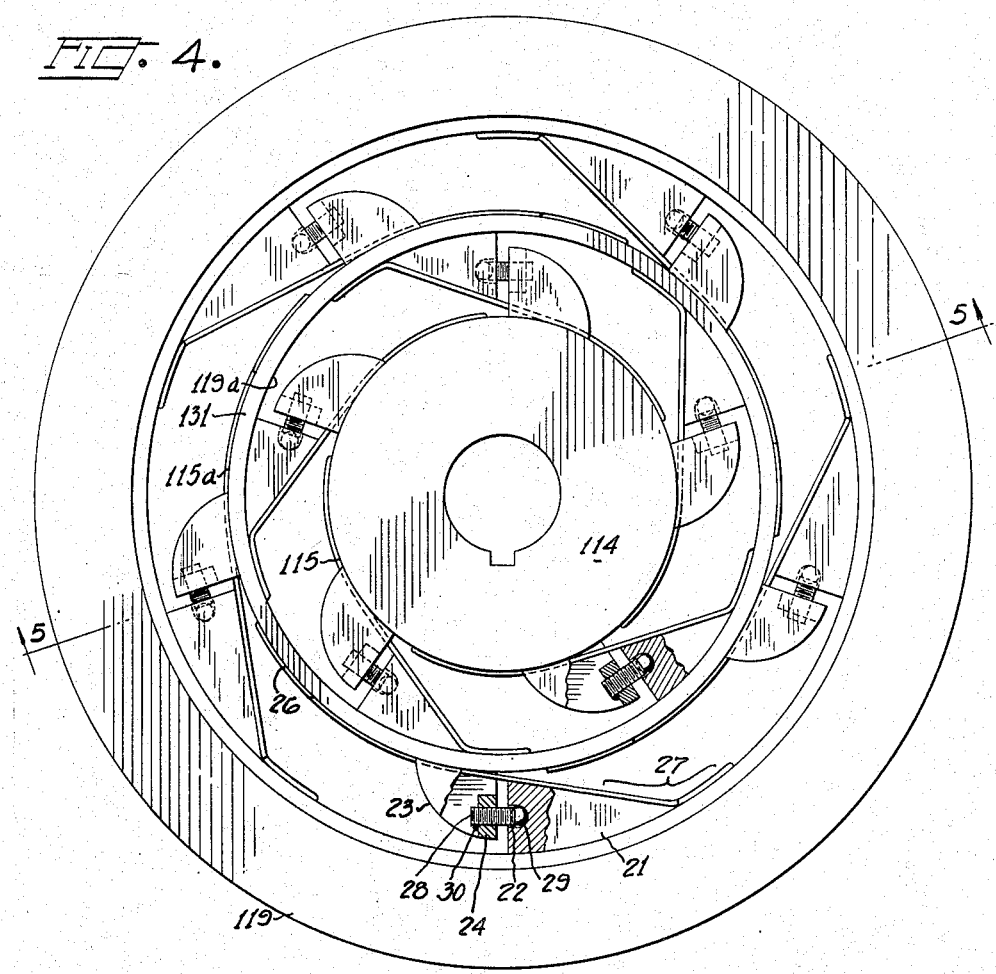
Figure 5:
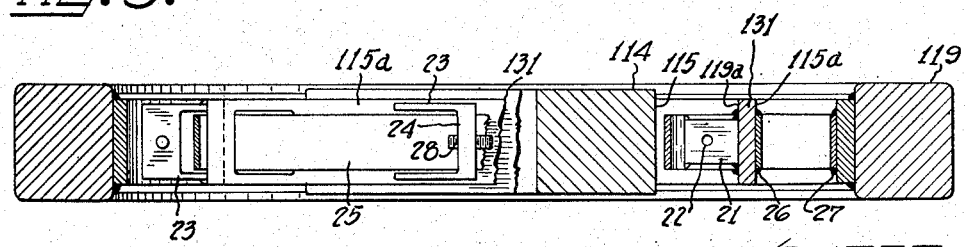

Fig. 5 is a broken view in partial section along the line 5—5 of Fig. 4.

Like numbers of reference refer to like parts throughout the several figures of the drawings.

Referring to Figs. 1 to 3, there is shown an axle 10 carrying anti-friction bearings (not shown), on which is mounted a hub comprising essentially a cylindrical bearing housing part 11 and a disk shaped radial web portion 12, to which is secured by stud bolts 13 the disk shaped radial web portion 14 of an automobile wheel hub having an axially extending cylindrical outer member 15. Cover 16 is secured to housing member 11 by cap screws 17 and brake drum 18 is secured by welding to web 12.

Drop center wheel rim 19 is designed to carry a pneumatic tire indicated at 20.

Welded to the under side of wheel rim 19 are wedge shaped solid members 21 having cavities 22 sunk into their radial faces. Hollow and generally wedge shaped members 23 formed with cross bridging elements 24 at their radial faces are welded to wheel hub member 15. Steel strap tension members 25 are welded at their inner ends as shown at 26 to member 15, pass between the upstanding legs of member 23, under cross member 24 and, as shown at 27, are welded at their outer ends to wedge shaped members 21 and the under side of wheel rim 19.

Socket headed, cup painted set screws 28 are threaded through cross members 24 and press against steel balls 29 set in cavities 22 in wedge shaped members 21. Set screws 28 are set up tightly and uniformly in three or more positions around the wheel (5 positions shown) and by exerting uniform pressures on tension straps 25 tend to keep wheel rim 19 concentric with axle 10. When set up, set screws 28 are tack welded in place as shown at 30.

In normal use, the wheel rotation is counter-clockwise referred to Fig. 1. In this case, the torque of axle 10 is transmitted through the wheel hub, members 23, 24, screws 28 and members 21 to wheel rim 19. Due to the elasticity of the metal of which straps 25 are made and due to the geometry of the suspension, forces acting on rim 19 can produce equivalent though slight eccentricities in the relation of the wheel rim to the wheel hub and lessen the shock transmitted through the suspension to the axle. These forces may be road shock on tire 20 or may be the centrifugal forces acting on elements of unbalance in the wheel rim and tire structure.

Slight motions of the rim, with respect to the hub, cause slight rolling motions of balls 29 which thereby eliminate what would be a destructive scrubbing of the points of screws 28 on members 21 if balls were not interposed between them.

Figs. 4 and 5 illustrate an application of the suspension of this invention to a wheel of larger size and having a greater rim mass at a greater radius of gyration. Usually in use, such a wheel will be rotating at relatively high speed and will be used where it is desired to have the wheel in nearly perfect running balance. In this case it is recommended that the suspension be applied to the wheel in cascade, or in two or more concentric layers, as shown.

Each layer of this suspension is essentially the same in every particular as the single layer suspension of Figs. 1 to 3. Therefore, the drawings are not confused by adding numbers to the parts which are sufficiently described in detail in the description of Figs. 1 to 3. It is merely necessary here to point out that in the suspension of Figs. 4 and 5, there is shown a wheel hub 114 having an outer cylindrical surface 115, a wheel rim 119, and that radially intermediate the hub and rim and spaced from each of them is an equalizing member 131 having an inner surface 119a and an outer cylindrical surface 115a. One complete single suspension system as shown in Figs. 1 to 3 is assembled as shown in Figs. 4 and 5, between hub surface 115 and equalizer surface 119a while another complete single suspension system is assembled as shown between equalizer surface 115a and the inner surface of rim member 119.

Having thus shown and described two forms of the construction and use of wheels built in accordance with this invention, I claim:

1. In a wheel having a hub member and a rim member radially spaced therefrom, said hub member having a cylindrical outer surface, a suspension system supporting said rim member on said hub member, said system comprising three or more suspension units circumferentially equally spaced in the radial space between said hub member and said rim member, each of said suspension units comprising a radially relatively flexible and axially relatively inflexible tension member secured at one end to said rim member and at its other end to said hub member to approach said hub member tangentially of its outer cylindrical surface, and a compression screw interposed circumferentially between said hub and rim members adapted to increase the tension on said tension member.

2. In a wheel having an inner hub member and an outer rim member radially spaced therefrom, said hub member having a cylindrical outer surface, a suspension system supporting said rim member on said hub member, said system comprising three or more suspension units circumferentially equally spaced in the radial space between said hub member and said rim member, each of said suspension units comprising a radially relatively flexible and axially relatively inflexible tension member secured at one end to said hub member and at its other end to said rim member and to approach said hub member tangentially to its outer cylindrical surface, and a compression screw interposed circumferentially between said hub and rim members adapted to increase the tension on said tension member.

3. The device described in claim 2 in which one end of the screw has a threaded attachment to said hub member and the other end of said screw having a ball and socket connection to said rim member.

4. A wheel comprising a hub structure and an encircling rim structure uniformly radially spaced from said hub structure, together with three or more suspension units equally spaced about said hub structure securing said hub structure to said rim structure, each of said units comprising a tension member strained tangentially of said hub structure between said hub structure and said rim structure and compression means strained between said hub structure and said rim structure adapted to maintain said tension member strained in its position between said hub structure and said rim structure, said compression means comprising a compression screw adapted to set said compression means in compression and thereby set said tension means in tension.

PHILO G. GILBERT.

References Cited in the file of this patent

UNITED STATES PATENTS

| Number | Name | Date |
|--------|------|------|
| 937,969 | Stewart | Oct. 26, 1909 |
| 1,276,679 | Morgan | Aug. 20, 1918 |
| 1,506,986 | Miller | Sept. 2, 1924 |
| 1,630,920 | Balogh | May 31, 1927 |
| 1,643,248 | Lawrence | Sept. 20, 1927 |
| 2,426,358 | Klages | Aug. 26, 1947 |
| 2,465,558 | Toth | Mar. 29, 1949 |
| 2,628,651 | Gilbert | Feb. 17, 1953 |